(12) United States Patent
Benezra et al.

(10) Patent No.: US 11,773,605 B2
(45) Date of Patent: Oct. 3, 2023

(54) APPARATUS FOR MOUNTING AN ACCESSORY TO AN ARCHITECTURAL STRUCTURE

(71) Applicant: International Door Products, Inc., Southfield, MI (US)

(72) Inventors: David Benezra, Southfield, MI (US); Isaac Benezra, Southfield, MI (US)

(73) Assignee: International Door Products, Inc., Southfield, MI (US)

(*) Notice: Subject to any disclaimer, the term of this patent is extended or adjusted under 35 U.S.C. 154(b) by 44 days.

(21) Appl. No.: 17/336,586

(22) Filed: Jun. 2, 2021

(65) Prior Publication Data
US 2021/0381260 A1 Dec. 9, 2021

Related U.S. Application Data

(60) Provisional application No. 63/033,903, filed on Jun. 3, 2020.

(51) Int. Cl.
*E04F 19/06* (2006.01)
*F16M 13/02* (2006.01)

(52) U.S. Cl.
CPC ............. *E04F 19/06* (2013.01); *F16M 13/02* (2013.01)

(58) Field of Classification Search
CPC .......... E04F 19/06; E04F 19/02; F16M 13/02
USPC ................................................. 248/48.2, 200
See application file for complete search history.

(56) References Cited

U.S. PATENT DOCUMENTS

| | | | |
|---|---|---|---|
| 2010/0171017 A1* | 7/2010 | Chang | F16M 13/02 248/274.1 |
| 2012/0246957 A1* | 10/2012 | Daniel | G01C 9/24 33/645 |
| 2016/0018054 A1* | 1/2016 | Simon | F16B 2/065 248/222.14 |
| 2016/0245457 A1* | 8/2016 | Skull | F16M 13/02 |

* cited by examiner

*Primary Examiner* — Muhammad Ijaz
(74) *Attorney, Agent, or Firm* — The Dobrusin Law Firm, P.C.

(57) ABSTRACT

An assembly and a method for affixing an assembly to a structure. The assembly includes a bracket and an accessory. The bracket includes two or more bracket retainers and a bracket lock extending into an opening formed in the bracket. The accessory includes two or more accessory retainers, and an accessory lock. The two or more accessory retainers define receiving features, which accept the two or more bracket retainers when the accessory is in an engaged position with the bracket. The accessory has a sliding engagement with the bracket, from the engaged position to a locked position, in which the bracket lock engages with the accessory lock.

19 Claims, 7 Drawing Sheets

APPARATUS FOR MOUNTING AN ACCESSORY TO AN ARCHITECTURAL STRUCTURE

PRIORITY

This application claims the benefit of U.S. 63/033,903 filed on Jun. 3, 2020, the entirety of which is expressly incorporated by reference herein for all purposes.

FIELD

The present teachings generally relate to an apparatus and a method for affixing an accessory to an architectural structure.

BACKGROUND

Decorative and/or functional fixtures may be incorporated in/on buildings or structures thereof (e.g., doors, fireplaces, walls, and the like). One example of a decorative fixture is a dentil shelf for use on main exterior doors. Dentil shelves provide curb appeal to the main entryway of houses as well as tailor the door to blend with an overall architectural style of houses (e.g., craftsman style house).

Some fixtures are provided to the consumer prefabricated on structures or professionally installed on buildings. These types of fixtures tend to be expensive due to the grade of materials used and the craftsmanship involved in installation. However, the aesthetic quality of the fixture as well as the strength and longevity of the fixture are obtained in exchange for the high expense. Consumer installation, for these types of fixtures, is not typically feasible due to the skill and/or equipment required to properly install the fixture.

Some fixtures are available for consumer installation. However, these fixtures can: be subject to damage and/or surface wear from prolonged elemental exposure, have exposed fasteners visible on the decorative surface, have a weak attachment to a surface, be removed with relative ease, or any combination thereof.

It would be desirable to have a fixture that can be selected and installed by a consumer. It would be desirable to provide a fixture that is easy to install. It would be desirable to provide a fixture that is firmly mountable to a building or structure thereof. It would be desirable to provide a fixture that is not easily removable from the building or structure thereof after installation.

SUMMARY

These teachings provide a fixture that can be selected and installed by a consumer. These teachings provide a fixture that is easy to install. These teachings provide a fixture that is firmly mountable to a building or structure thereof. These teachings provide a fixture that is not easily removable from the building or structure thereof after installation.

These teachings provide an assembly and a method for affixing an assembly to a structure. The assembly includes a bracket and an accessory. The bracket includes two or more bracket retainers and a bracket lock extending into an opening formed in the bracket. The accessory includes two or more accessory retainers, and an accessory lock. The two or more accessory retainers define receiving features, which accept the two or more bracket retainers when the accessory is in an engaged position with the bracket. The accessory has a sliding engagement with the bracket, from the engaged position to a locked position, in which the bracket lock engages with the accessory lock.

DETAILED DESCRIPTION

Figure 1:
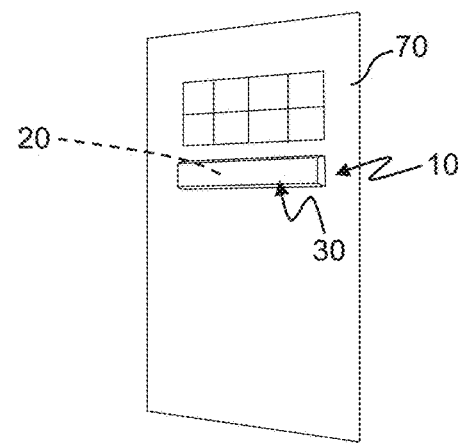
FIG. 1 is a perspective view of the accessory installed on an architectural structure.

The present teachings meet one or more of the above needs by an improved assembly, apparatus, and method described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present disclosure provides for an apparatus or assembly, which may comprise one or more brackets and/or one or more accessories.

The apparatus, bracket, accessory, a combination thereof may be suitable for prolonged exposure to outdoor conditions (e.g., 5 years or more, 10 years or more, or even 15 years or more). The apparatus, bracket, accessory, a combination thereof may be moisture resistant, UV resistant, chemical resistant, or any combination thereof. The apparatus, bracket, accessory, a combination thereof may have a low coefficient of thermal expansion (i.e., low dimensional distortion at reduced or elevated temperatures, with respect to 23° C.). The apparatus, bracket, accessory, a combination thereof may comprise different materials, the same materials, or both. The apparatus, bracket, accessory, a combination thereof may comprise polymer (e.g., polydicyclopentadiene, phenolic resin, nylon, polypropylene, polycarbonate, acrylic, polyvinylidene fluoride, the like,), metal (e.g., aluminum, steel, metal), wood, or any combination thereof. The apparatus, bracket, accessory, a combination thereof may be formed by any suitable process including but not limited to injection molding, compression molding, extrusion, drawing, stamping, or any combination thereof.

The apparatus may comprise one or more brackets. The bracket may function to mount or attach to an architectural structure, be received by an accessory, or both. The bracket may be substantially planar. The bracket, when installed, may be substantially flush with a mounting surface of the architectural structure. The bracket may be an integral member that is formed into or with a structure. In other words, one or more of the features or elements of the bracket may be designed into, incorporated into, and/or made with the structure. The bracket may be attached, connected, or coupled to the structure.

The structure may be a door, a wall, or both. The structure may be an exterior or interior door or wall. The structure may be a movable structure or a stationary structure. The structure may be a floor and the bracket may be mounted or attached to the floor. The structure may be a ceiling for attaching an accessory (such as a chandelier, light, or other structure) to the ceiling. The structure may also be incorporated into other structures like vehicles, airplanes, or other structures where it may be desirable to attach an accessory thereto or thereon. In some configurations, the accessory may be an intermediate piece that can be attached to another object. For example, the accessory can be attached to a television and the television can be attached to a wall or structure by engaging the accessory to the bracket attached to the wall. For example, the accessory can be attached to an HVAC duct and the HVAC duct can be attached to a ceiling, wall, or structure by engaging the accessory to the bracket attached to the wall or ceiling. The structure may be inside a house or building or outside the house or building. The structure may be drywall, wood or metal framing, brick, vinyl siding, plaster, cement.

The bracket may comprise one or more bracket retainers. The one or more bracket retainers may function to be accepted by the accessory, engage with the accessory, retain the accessory, or any combination thereof. The one or more bracket retainers may be located on one side of the bracket (e.g., a first side) or both sides of the bracket (e.g., a first side and an opposing second side). The one or more bracket retainers may be located on one or all of the edges of the bracket, even one or both of the edges that are substantially perpendicular to the first and second sides disclosed herein.

Figure 7A:
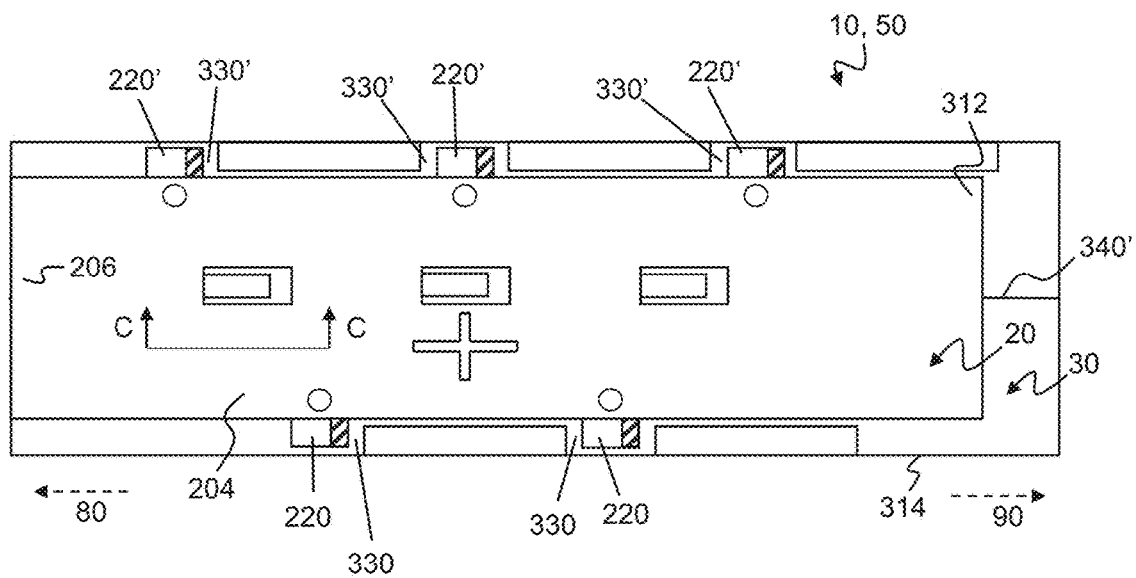
FIG. 7A is a plan view of an assembly in an engaged position.
Figure 7B:
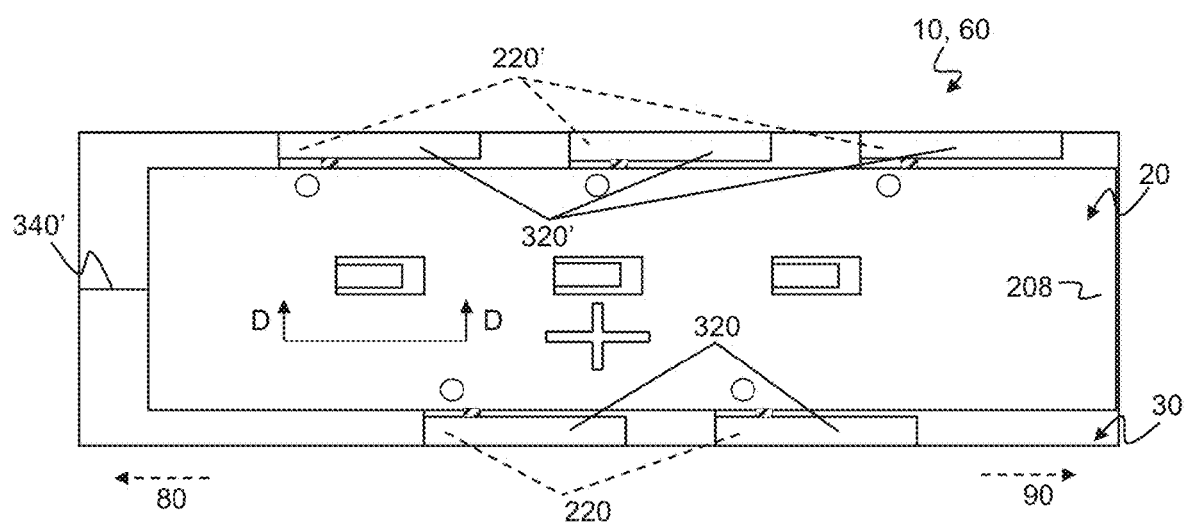
FIG. 7B is a plan view of an assembly in a locked position.

The quantity and placement of the bracket retainers may be chosen to provide a selective amount of strength of the engagement between the bracket and the accessory. For example, a bracket having five bracket retainers may have a stronger engagement with the accessory as compared to a bracket having two bracket retainers. As another example, an even, symmetrical distribution of the bracket retainers along the length of the bracket may provide for a more consistent strength of engagement along the length of the bracket as compared to a bracket having bracket retainers only toward one end of the bracket. The one or more bracket retainers may be arranged axially offset from one another, axially aligned with one another, or both. The one or more bracket retainers may be arranged so that movement of the accessory on the bracket may be limited in certain positions. For example, FIG. 7A shows an arrangement of the bracket retainers that provide for an abutment of a first side of the bracket with a sidewall of the accessory when the apparatus is in an engaged position. As another example, FIG. 7B shows that the same arrangement of the bracket retainers provide for an abutment of a second side of the bracket with a sidewall of the accessory when the apparatus is in a locked position. There may be one or more bracket retainers, two or more bracket retainers, three or more bracket retainers, and so on. The number of bracket retainers on the first side of the bracket may equal the number of bracket retainers on the second side. The number of bracket retainers on the first side of the bracket may be more than the number of bracket retainers on the second side. The number of bracket retainers on the first side of the bracket may be less than the number of bracket retainers on the second side.

The one or more bracket retainers may comprise a first portion. The first portion may be attached to the bracket with one or more fasteners like screws or adhesive. The first portion may be integrally formed (e.g., molded) with the bracket. The first portion may project orthogonally a distance from a side (e.g., the first side) of the bracket. The one or more bracket retainers may each comprise a second portion, which may engage with the accessory. The second portion may extend from the edge of the bracket, the first portion, or both, a distance of from about 5 mm to about 3 cm.

In one aspect, the one or more bracket retainers may extend laterally beyond edges of the bracket. Two or more bracket retainers may extend beyond opposing edges of the bracket. For example, at least one bracket retainer may laterally extend, in a first direction, from a first edge of the bracket and at least one other bracket retainer may laterally extend, in a second direction opposing the first direction, from a second edge of the bracket, opposing the first edge.

The second portion of the one or more bracket retainers may comprise a beveled edge formed thereon. The beveled edge may function to engage the accessory retainer, discussed in more detail below, and cause the accessory to press against the bracket when the accessory is moved from an engaged position to a locked position. The beveled edge may slope upward from the edge of the one or more bracket retainers. The beveled edge may be a ramp. The beveled edge may be a drafted portion the bracket retainer. The beveled edge may be formed on any side of the bracket retainers that come into contact with the accessory retainers during longitudinal movement of the accessory. The beveled edge may be located on a same side or different side of the retainers than the bracket locks extend.

The bracket may comprise one or more bracket locks. The one or more bracket locks may function to receive and/or engage with the one or more accessory locks. The one or more bracket locks may be a female-type connection (e.g., an aperture, a groove, a slot, the like, or any combination thereof), a male-type connection (e.g., a tab, a tang, a button spring clip, a detent, the like, or any combination thereof), or both. The one or more bracket locks may be arranged, with respect to one another, axially offset, arranged co-axially, or both. The one or more bracket locks may be arranged co-axially along a longitudinal axis of the bracket. For example, the one or more bracket locks may be arranged co-axially along a center longitudinal axis of the bracket.

In one aspect, the one or more bracket locks may be tabs configured to engage with grooves. The one or more tabs may extend cantilever into an opening formed in the bracket. The one or more tabs, or any portion thereof may be arranged substantially co-planar with the bracket or may extend, at an angle, from the plane of the bracket, or both. For example, the one or more tabs may include a portion extending co-planar with the bracket and another portion that is bent (i.e., angled) away from the plane of the bracket. The bracket locks may extend in a uniform direction, in different directions, or both. The one or more tabs may bias when a force is exerted upon them. For example, a force exerted upon an end of the one or more tabs may cause the one or more tabs to bend at a fulcrum of where the one or more tabs meet the bracket.

The bracket lock may comprise one or more projections. The one or more projections may function to receive and/or engage with the one or more accessory locks. The one or more projections may comprise a ramp and a notch. The projection or a portion thereof may extend beyond a side (e.g., the first side) of the bracket. The projection may movably engage with the accessory or a portion thereof. For example, as the accessory is moved from an engaged position to a locked position, the accessory is pressed toward the bracket, by the engagement of the beveled edges of the one or more bracket retainers with the one or more accessory retainers, and the bracket lock is caused to bias away from the accessory, by an engagement of the projection with the accessory. The projection may prevent longitudinal movement of the accessory. For example, engagement of the notch with the accessory lock (e.g., a groove) prevents longitudinal movement of the accessory.

The bracket may comprise one or more mounting holes. The one or more mounting holes may function to receive fasteners (e.g., wood screws or the like). The one or more mounting holes may be through holes extending from a first side of the bracket to a second side of the bracket; extending through the bracket retainers; or both. The one or more mounting holes may be arranged adjacent to edges of the bracket; arranged inward from the edges of the bracket; or both. At least one mounting hole may be located adjacent a first edge of the bracket and at least one other mounting hole may be located adjacent a second edge of the bracket, opposing the first edge. Mounting holes located on opposing edges of the bracket may be arranged co-axially, arranged axially offset, or both. Placement of the mounting holes may be chosen to provide structural reinforcement to portions of the bracket. For example, due to the function of the bracket retainers, which hold the accessory in-place, it may be desirable to place the one or more mounting holes on the first portions of the one or more bracket retainers to preclude deformation and/or damage of the bracket retainers in the event the accessory is pulled away from the bracket by an external force.

The bracket may comprise one or more alignment features. The one or more alignment features may function to allow a user to view markings on a mounting surface of the architectural structure. For example, a user may mark on the mounting surface a desired height of the accessory and/or a desired lateral placement of the accessory on the architectural structure; the user may also use a level to mark a level line; and the alignment feature may allow the user to position the bracket on the architectural structure congruent with the markings. The alignment feature may be a window formed in the bracket extending from the first side to the second side of the bracket. The alignment feature may comprise two perpendicularly intersecting cross-members. The alignment feature may be arranged along a longitudinal axis of the bracket, a transverse axis of the bracket, or both.

The alignment feature may be centered along the longitudinal axis of the bracket, the transverse axis of the bracket, or both.

The apparatus of the present disclosure may comprise an accessory. The accessory may function as an architectural ornament. The accessory may be a molding (e.g., dentil shelf), a trim, a mantel, a shelf, or a boss. The accessory may be a soap dish for a shower or bathroom, a bookshelf, a wall (e.g, and the bracket may be mounted to the floor), a cabinet, a television, HVAC duct, picture, clock, mirror, or a combination thereof. The accessory may be a light figure, chandelier, or fan. For example, the accessory may be a dentil shelf used on an exterior door (e.g., main entry doorways of residential properties) to enhance curb appeal of the property. As another example, the accessory may be a mantel mounted over a fireplace.

The accessory may be free of using ancillary fasteners (screws, pins, bolts, adhesives, etc.) to attach to the bracket, structure, or both. Instead, the accessory may be retained or attached to the bracket, structure, or both via one or more of the elements disused herein that are molded or part of the accessory and/or bracket. The bracket may be attached to the structure using one or more fasteners, like screws, bolts, pins, adhesives, etc.

The accessory may comprise an outwardly facing portion (i.e., front portion). The outwardly facing portion may function as the ornamental element of the accessory. The outwardly facing portion may have various shapes, colors, textures, or any combination thereof. For example, a wood grain texture may be molded into the outwardly facing portion. The outwardly facing portion may be surface treated to accept paint, stain, coatings, or any combination thereof.

The accessory may comprise one or more ribs. The one or more ribs may function to structurally reinforce the accessory. The one or more ribs may be advantageous for used in accessories that are hollowed-out). The one or more ribs may extend within an interior portion of the accessory. The one or more ribs may extend longitudinally, transversely, at an angle, or any combination thereof, within an interior portion of the accessory (i.e., between the outwardly facing portion and the cavity). The one or more ribs may project from the front portion of the accessory and terminate at the cavity. The one or more ribs may be integrally formed (e.g., molded) on the outwardly facing portion or formed separately and affixed to the outwardly facing portion.

The cavity may include one or more bosses. The one or more bosses may function to reinforce the accessory, the one or more ribs, or both. The one or more bosses may extend within an interior portion of the accessory. The one or more ribs may project from the front portion of the accessory and terminate at the cavity. The one or more bosses may be integrally formed (e.g., molded) on the outwardly facing portion or formed separately and affixed to the outwardly facing portion.

The accessory may comprise a sidewall. The sidewall may function to define the cavity. The sidewall may extend a distance beyond the ribs and/or bosses. Preferably, the sidewall is dimensioned so in an engaged position and/or locked position, the bracket is flush with a top edge of the sidewall and/or the top of the sidewall is flush with the mounting surface. The sidewall may extend around the perimeter of the accessory or a portion thereof.

The accessory may comprise a cavity (i.e., back portion). The cavity may function to receive the bracket. The cavity may be defined by the ribs, bosses, sidewall, or any combination thereof. The cavity may oppose the outwardly facing portion. The cavity, when the accessory is installed, may face the mounting surface of the architectural structure. The cavity may be dimensioned so that substantially no gaps are present between the sidewall and the bracket (i.e., play between the bracket and accessory is reduced and/or eliminated). For example, the cavity may have a lateral length that is substantially the same as the length between the tips of two bracket retainers on opposing ends of the bracket. As another example, the cavity may be configured so that, in a locked position, a second end of the bracket abuts the sidewall. Managing the presence and extent of gaps between the accessory and the bracket, particularly in the locked position, ensures a firm fit of the apparatus when it is installed on an architectural structure.

The accessory may comprise one or more accessory retainers. The one or more accessory retainers may function to accept the bracket, engage, with the bracket, retain the bracket, or any combination thereof. The one or more accessory retainers may be located on one side of the accessory or both sides of the accessory. There may be a complementary accessory retainer for every one of the bracket retainers. The one or more accessory retainers may extend longitudinally a distance that is between the engaged position and the locked position. The one or more accessory retainers may be arranged axially offset from one another, axially aligned with one another, or both. The one or more accessory retainers may be located on opposing edges of the accessory. The one or more accessory retainers may extend proximally into the cavity from the sidewall. The one or more accessory retainers may extend cantilever over the cavity. The one or more accessory retainers may have a thickness that is substantially equal to the thickness of the bracket so that the bracket is flush with the sidewall.

The accessory retainers may define one or more receiving features. The one or more receiving features may function to receive the one or more bracket retainers to position the accessory and the bracket in an engaged position. The one or more receiving features may be defined by the side wall and gaps between and/or adjacent to the one or more accessory retainers. At least one of the receiving features may be located on a first edge of the accessory and at least one other of the receiving features may be located on a second edge of the accessory, opposing the first edge. The receiving features, located on opposing edges of the accessory, may be arranged axially offset from one another, axially aligned with one another, or both.

The accessory may comprise one or more accessory locks. The one or more accessory locks may function to receive and/or engage with the one or more bracket locks. The one or more accessory locks may be a female-type connection (e.g., an aperture, a groove, a slot, the like, or any combination thereof), a male-type connection (e.g., a tab, a tang, a button spring clip, a detent, the like, or any combination thereof), or both. For example, the one or more accessory locks may be a groove formed in the accessory and configured to accept a tab. The one or more accessory locks may be formed in the interior portion of the accessory. For example, the one or more accessory locks may be grooves formed into the ribs of the accessory. The one or more accessory locks may be arranged axially offset, arranged co-axially, or both. The one or more accessory locks may be arranged co-axially along a longitudinal axis of the bracket. For example, the one or more accessory locks may be arranged co-axially along a center longitudinal axis of the bracket. The position of the accessory locks may be complementary to the position of the bracket locks when the apparatus is in a locked position.

The accessory and the bracket may be positioned in an engaged position. The engaged position may be defined by acceptance of two or more bracket retainers of the bracket by corresponding receiving features of the accessory; acceptance of the bracket by the cavity of the accessory; or both. The location of the two or more bracket retainers and the corresponding receiving features may direct the orientation of the accessory with respect to the bracket. For example, the accessory may be positionable in the engaged position when a first edge of the accessory is oriented with a first edge of the bracket and the engaged position is precluded when the first edge of the accessory is oriented with a second edge of the bracket (i.e., a user may be prevented from installing the accessory up-side-down). The location of the two or more bracket retainers and the corresponding receiving features may allow the accessory and the bracket to be positioned in one or more different orientations. The accessory may substantially abut a mounting surface of an architectural structure in the engaged position. A second side of the bracket may be substantially flush with a sidewall of the accessory in the engaged position.

The accessory may have a longitudinally sliding engagement with the bracket between the engaged position and the locked position. Before the apparatus is positioned in a locked position, the accessory may be free to move back-and-forth longitudinally. The longitudinal movement of the accessory may be limited by the engagement of the bracket with the sidewall of the accessory.

Moving the accessory from the engaged position toward the locked position may cause: the beveled edges to engage the one accessory retainers and press the accessory toward the bracket; the accessory (e.g., the ribs) to bias the bracket lock away from the accessory; or both.

The accessory and the bracket may be positioned in a locked position. The locked position may be defined by engagement of the bracket lock (e.g., the projection) with the accessory lock. The accessory may be moved from an engaged position to the locked position by longitudinally sliding the accessory with respect to the bracket. The apparatus may be positioned in the locked position by sliding the accessory lock toward the bracket lock. The bracket lock may be free from bias in the locked position.

In the locked position, the apparatus may be permanently affixed to an architectural structure. "Permanent", as used herein, may mean that the apparatus may not be removed without damaging the apparatus and/or damaging the architectural structure. For example, the bracket lock may be biased away from the accessory lock to release the accessory from the bracket but the fastened abutment of the bracket to a mounting surface may preclude access to the bracket lock to release the bracket lock from the accessory lock.

The present disclosure provides for the following method. The method may comprise one or more of the following steps. Some of the steps may be duplicated, removed or eliminated, rearranged relative to other steps, combined into one or more steps, separated into two or more steps, or a combination thereof.

A method for affixing an accessory to an architectural structure comprising the steps of: locating a bracket onto the architectural structure; fastening the bracket to the architectural structure; positioning the accessory and the bracket in the engaged position in which two or more bracket retainers of the bracket are accepted by receiving features of the accessory; sliding the accessory longitudinally with respect to the bracket toward the locked position and causing the two or more bracket retainers to engage with two or more accessory retainers of the accessory; and causing the bracket lock to engage with the accessory lock in a locked position.

The sliding step may cause the accessory to bias the bracket lock away from the accessory. In the locked position, the bracket may be free from bias by the accessory and may return to an unbiased position.

FIG. 1 is a perspective view of an assembly 10 mounted on an architectural structure 70, which may be a door. The assembly 10 includes a bracket 20 and an accessory 30. The bracket 20 may be secured to the structure 70. The bracket 20 may be secured to the structure 70 with one or more fasteners (i.e., nails, screws, bolts, rivets, welds, etc.) The accessory 30 may be secured to the bracket 20. The accessory 30 may be free of direct attachment or securement to the structure 70. In other words, the accessory 30 may be free of any fasteners (i.e., nails, screws, bolts, rivets, welds, etc.) securing the accessory to the structure 70. The accessory 30 may be secured or attached directly to the bracket 30 and the bracket 30 may be secured or attached directly to the structure 70.

Figure 2:
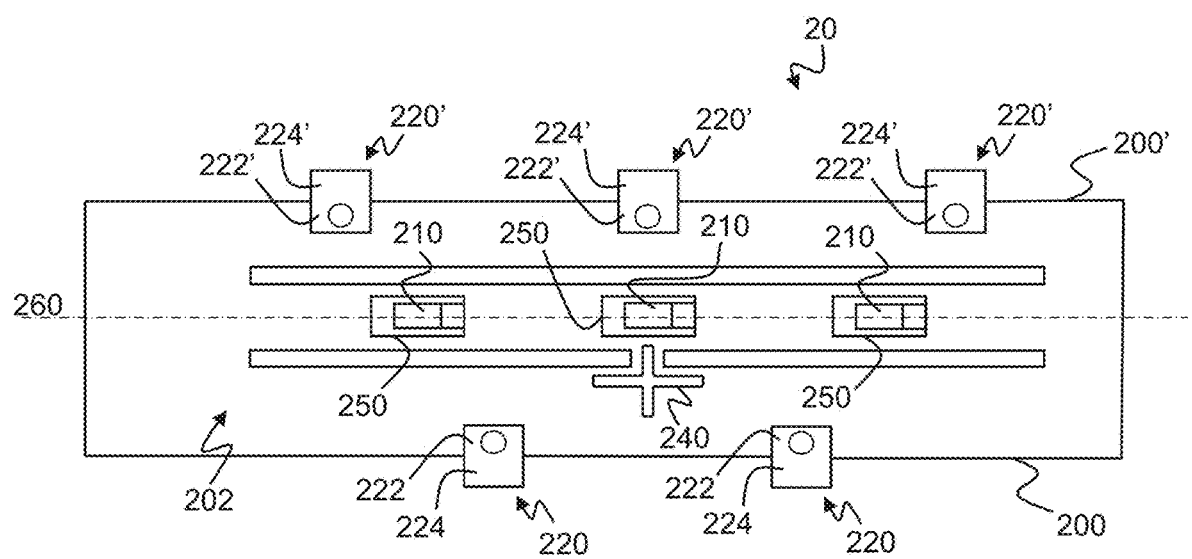
FIG. 2 is a plan view of a first side of a bracket.
Figure 4:
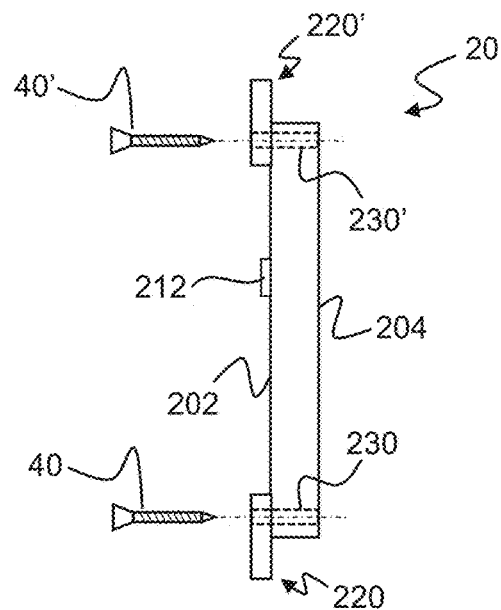
FIG. 4 is a view of the bracket along the line A-A shown in FIG. 3.

FIG. 2 is a plan view of the bracket 20. The bracket 20 includes a first side 202 and an opposing second side 204 (FIG. 4). The first side 202 may be a side of the bracket 20 that faces away from the structure 70 after the bracket 20 is attached or secured to the structure 70. The second side 204 may be the side that faces the structure, is in contact with the structure 70, and/or is juxtaposed to the structure 70 after the bracket 20 is attached or secured thereto.

The bracket 20 includes one or more bracket retainers 220. One or more of the bracket retainers 220 may extend at or from a first edge 200 of the bracket 20 and one or more bracket retainers 220' may extend at or from an opposing second edge 200' of the bracket 20. The bracket retainers 220 may be arranged axially offset from the bracket retainers 220'. However, in some configurations, one or more of the bracket retainers 220 may be axially aligned with one or more of the bracket retainers 220'. The bracket retainers 220, 220' each include a first portion 222, 222' and a second portion 224, 224'. The first portions 222, 222' are formed with the bracket 20 or attached thereto with one or more fasteners. The second portions 224, 224' overhang or extend cantilever from the edges 200, 200' of the bracket 20. While the other edges of the bracket 20 that are generally perpendicular to edges 200, 200' are shown without bracket retainers, in some configurations, one or both of the edges may also have one or more bracket retainers.

The bracket 20 includes one or more slots or openings 250. The bracket 20 includes one or more bracket locks 210. The one or more bracket locks 210 cantilever from an edge of the bracket 20 or edge defining the opening 250 towards an opposing edge of the openings 250. The openings 250 and bracket locks 210 may be arranged along a longitudinal axis 260 of the bracket 20. However, in some configurations, the openings 250 and bracket locks 210 may be staggered along the bracket 20 side 202 and free from extending along a single, common axis 260. The bracket 20 may include one or more alignment features 240.

Figure 3:
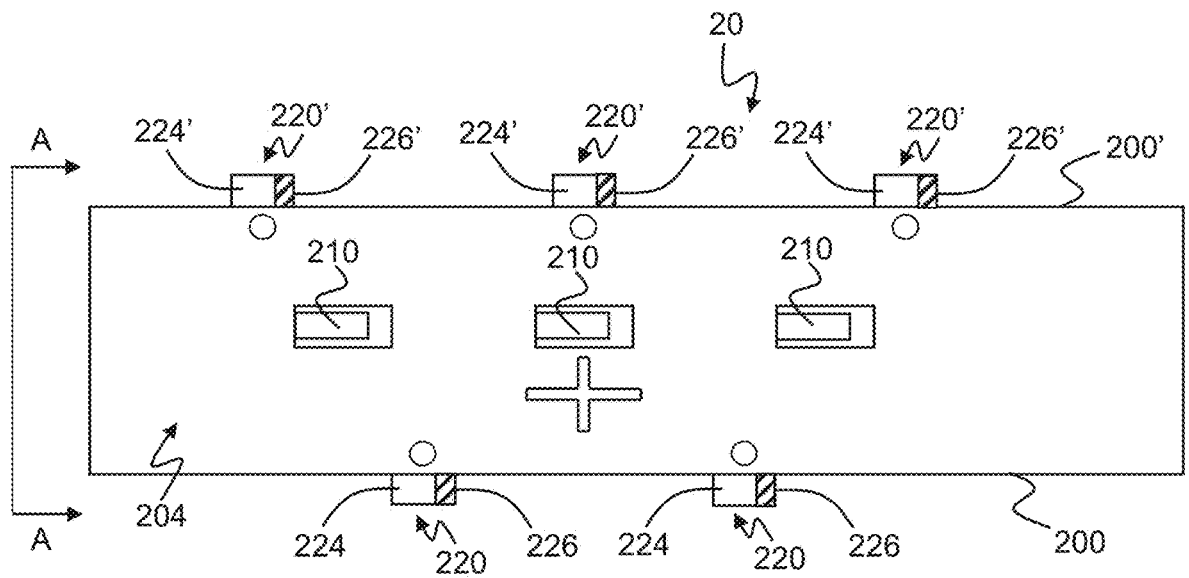
FIG. 3 is a plan view of a second side of the bracket illustrated in FIG. 1.

FIG. 3 is a plan view of a second side 204 of the bracket 20. The second side 204 may be the side or surface of the bracket 20 that faces or abuts against the structure 70 after the bracket 20 is attached or secured to the structure 70. In some fields of endeavors, the second side 204 may be referred to as a back side or B-side. The second portion 224, 224' of the bracket retainers 220, 200' extend past or cantilever over the opposing edges 200, 200' of the bracket 20. One or more of the bracket retainers 220, 220' may include a beveled edge 226, 226'. The beveled edges 226, 226' may be located on sides of the bracket retainers 220, 200' facing the same direction as the direction the bracket locks 210 extend cantilever from the bracket 20.

FIG. 4 is a view of the bracket 20 along the line A-A shown in FIG. 3. The one or more bracket locks 210 may include one or more projections 212. The one or more projections 212 extend beyond or project away from the first surface 202 (or front surface or A-surface) of the bracket 20. The one or more projections 212 may be configured to engage an accessory lock 350 of the accessory 30, discussed further below at FIG. 9. The bracket 20 includes one or more mounting holes 230, 230' configured to accept one or more fasteners 40, 40'. The mounting holes 230, 230' extend through a thickness of the bracket 20 and the bracket retainers 220, 220'. The fasteners 40, 40' are configured to extend through the mounting holes 230, 230' to attach or fasten the bracket 20 to architectural structure 70 (see FIG. 1).

Figure 5:
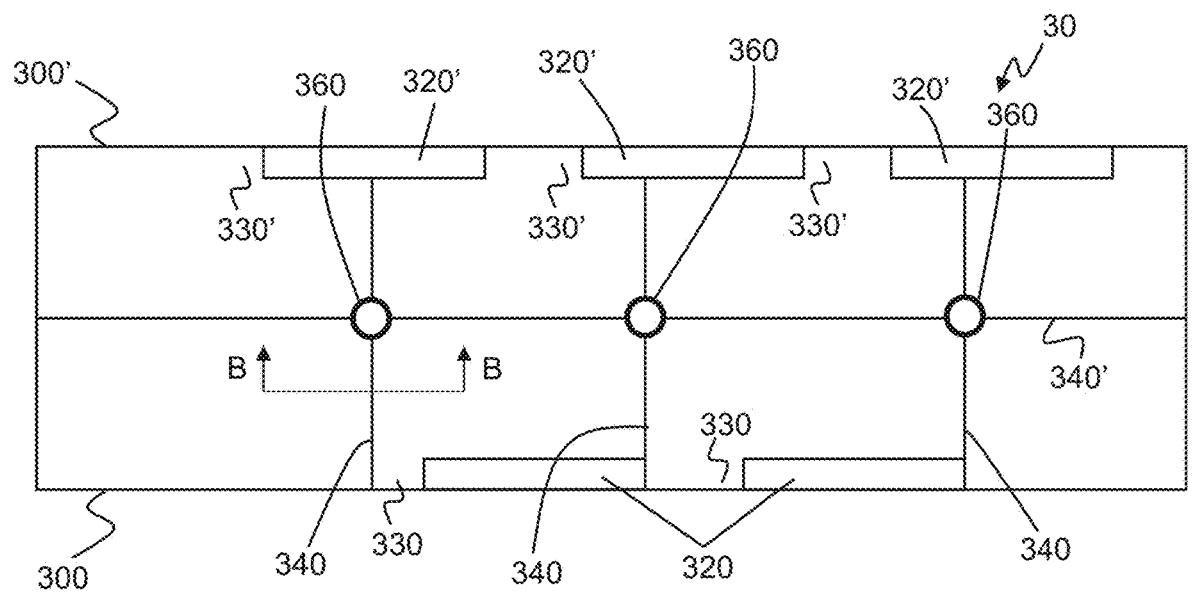
FIG. 5 a plan view of an accessory.

FIG. 5 illustrates a backside of the accessory 30, which may be a cavity 312. The accessory 30 includes one or more accessory retainers 320 and/or one or more accessory retainers 320'. The one or more accessory retainers 320 may extend from or cantilever from a first edge 300 of the accessory 30. The one or more accessory retainers 320' may extend from or cantilever from a second edge 300' of the accessory 30. The first edge 300 and the second edge 300' may be opposing edges. One or more accessory retainers may also be located on one or both of the other edges that are generally perpendicular to edges 300, 300'. The one or more accessory retainers 320 may be arranged axially offset from the accessory retainers 320'. However, in some configurations, the one or more accessory retainers 320 may be aligned with the one or more retainers 320'. Receiving features 330, 330' may be defined between adjacent accessory retainers 320, 320', which are gaps defined between and adjacent to the accessory retainers 320, 320'.

The back or B-side of the accessory 30 may include one or more generally ribs 340, 340'. The ribs 340' may be generally horizontal and the ribs 340 may be generally vertical relative to a longitudinal axis of the accessory 30. However, the ribs may be arranged at any suitable angle relative to the longitudinal axis. The accessory 30 may include one or more bosses 360. The one or more ribs 340, 340' may intersect with the one or more bosses 360 and together provide structural reinforcement to the accessory 30 and define a cavity 312 (see FIG. 6).

Figure 6:
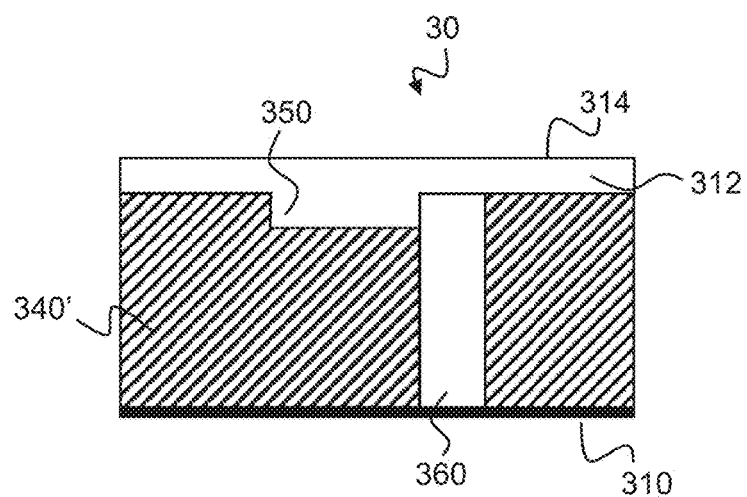
FIG. 6 is a view of the accessory along the line B-B shown in FIG. 5.

FIG. 6 is a view of the accessory 30 along the line B-B shown in FIG. 5. The rib 340' intersects with the boss 360. The rib 340' and the boss 360 extend from the outwardly facing portion 310 and terminate at the cavity 312. The cavity 312 is defined by the rib 340', the boss 360, and the sidewall 314 and the cavity 312 is dimensioned to accept a bracket 20 in an engaged position 50 and a locked position 60 (see FIG. 8 and FIG. 9) such that the bracket 20 is positioned flush with the top edge of the sidewall 314.

The rib 340' includes an accessory lock 350 formed therein. The accessory lock 350 may be a groove. The accessory lock 350 is configured to engage with the projection 212 (see FIG. 8) extending from the bracket 20 when the accessory 30 and the bracket 20 are in a locked position 60 (see FIG. 8).

FIG. 7A is a plan view of an assembly 10 in an engaged or assembled position 50, which will now also be described in installation or assembly method steps. In the engaged position 50, the bracket 20 may be fastened to the structure 70 (FIG. 1) with one or more fasteners. The cavity 312 of the accessory 30 is positioned or provided on top of the bracket 20 so that the first side 202 of the bracket 20 abuts the ribs 340, 340' (see FIG. 5) or is located adjacent the ribs without directly touching the ribs. The second side 204 of the bracket 20 may be substantially flush with the top of the sidewall 314 of the accessory 30 (see FIG. 8). The bracket retainers 220, 220' are accepted by the receiving features 330, 330' so that the bracket 20 can be positioned within the cavity 312. In the engaged position 50, the accessory 30 is free to move longitudinally in a first direction 80. The accessory 30 is prevented from movement in a second direction 90 by the abutment of a first end 206 of the bracket and the sidewall 314 of the accessory 30.

FIG. 7B is a plan view of an assembly 10 in a locked position 60. As the accessory 30 is moved horizontally or longitudinally in a first direction 80 relative to the bracket 20 that is fixed to the structure 70, from the engaged position 50 toward the locked position 60, the edges 226 of the bracket retainers 220 engage with the accessory retainers 320 and the accessory 30 is pressed against the ribs 340, 340' (see FIG. 5) of the bracket 20 as the accessory retainers 320 slide further along the beveled edges 226. As the accessory 30 is pressed toward the bracket 20, the projections 212 of the bracket locks 210 engage with the ribs 340 (see FIG. 5) and as a result, the bracket locks 210 are biased away from the accessory 30.

The accessory 30, before being positioned in the locked position 60, may be freely moved horizontally or longitudinally in either a first direction 80 or a second direction 90. Upon positioning the accessory in a locked position 60, movement in the first direction 80 is precluded by the engagement of the bracket lock 210 with the accessory lock 350 (see FIG. 9) and movement in the second direction 90 is precluded by the abutment of a second end 208 of the bracket 20 with the sidewall 314 of the accessory 30.

Figure 8:
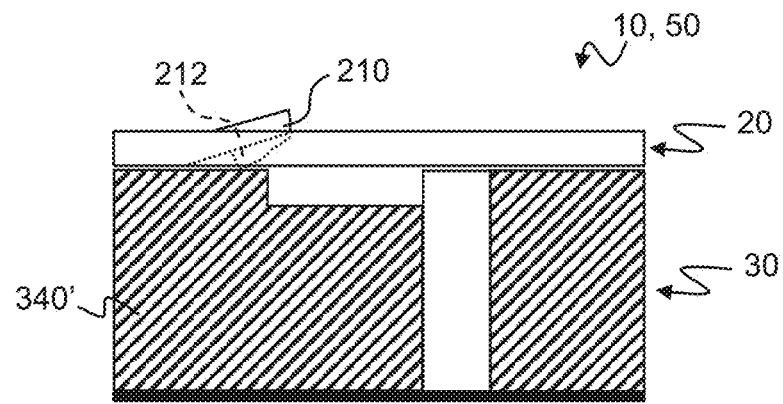
FIG. 8 is a view of the assembly along the line C-C shown in FIG. 7A.

FIG. 8 is a view of the assembly 10 along the line C-C shown in FIG. 7A. The assembly 10 is positioned in the engaged position 50 with the bracket 20 being accepted by the accessory 30. The rib 340' is engaged with and biasing the projection 212 of the bracket lock 210. As a result, the bracket lock 210 is biased away from the rib 340' and out of co-planar alignment with the bracket 20.

Figure 9:
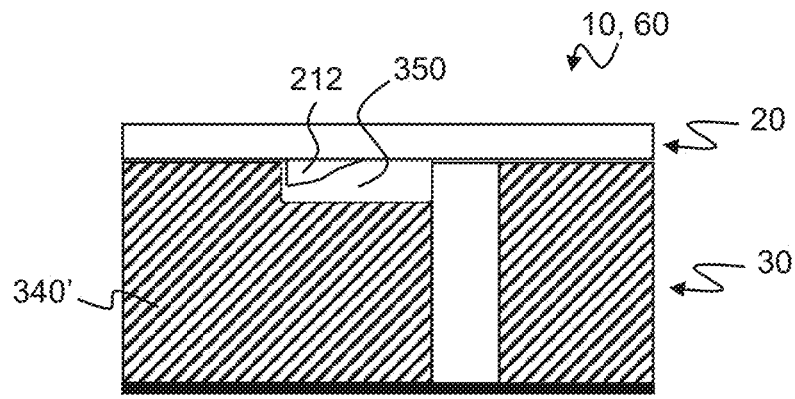
FIG. 9 is a view of the assembly along the line D-D shown in FIG. 7B.

FIG. 9 is a view of the assembly 10 along the line D-D shown in FIG. 7B. In the locked position 60, the projection 212 clears the edge of the accessory lock 350 and is freed from bias by the rib 340'. As a result, the projection 212 returns to an unbiased position, in co-planar alignment with the bracket 20, and extends into and engages with the accessory lock 350 formed in the rib 340'. Engagement of the projection 212 with the accessory lock 350 prevents longitudinal movement of the accessory 30 in the second direction 90 (see FIG. 7B).

Figure 10:
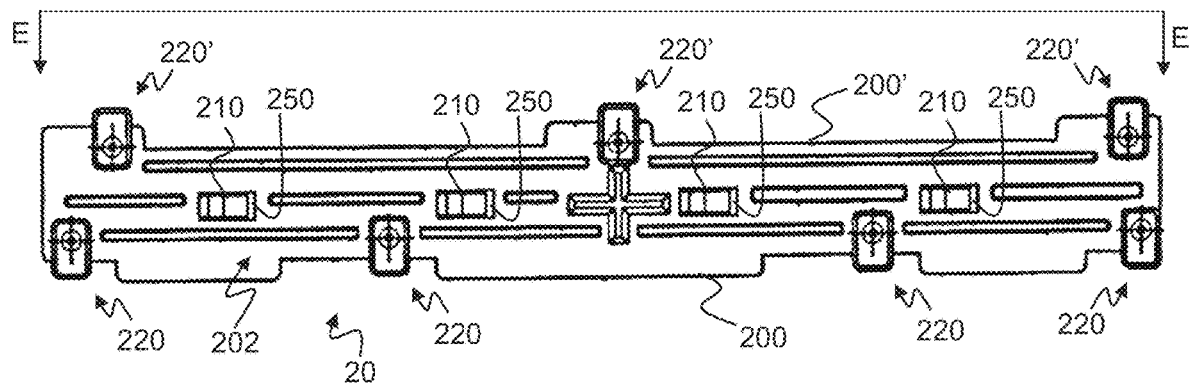
FIG. 10 is a plan view of a first side of a bracket.

FIG. 10 is a plan view of a first side 202 of a bracket 20 that may include one or more of the features or elements of the bracket 20 of the previous figures. The bracket 20 includes bracket retainers 220 extending from a first edge 200 and bracket retainers 220' extending from a second edge 200'. The bracket retainers 220 are arranged axially offset from the bracket retainers 220'. The bracket 20 includes openings 250 and bracket locks 210 extending in a uniform direction and cantilever from the bracket 20 into the openings 250.

Figure 11:
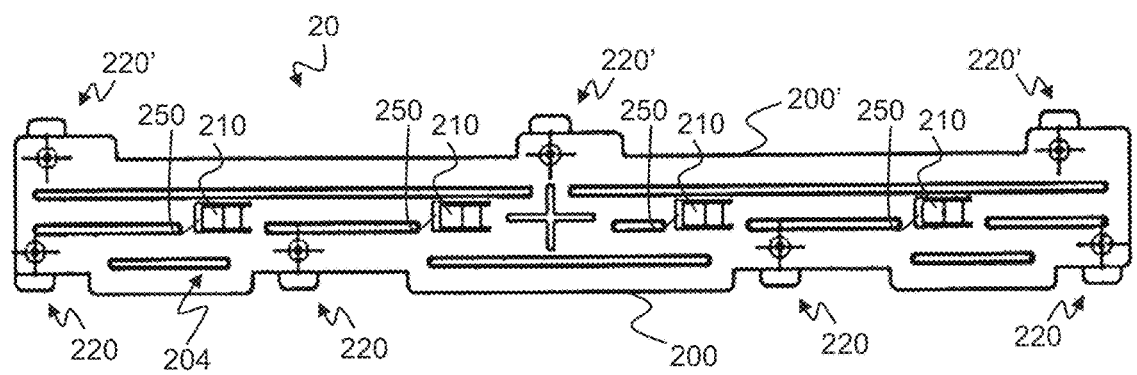
FIG. 11 is a plan view of a second side of the bracket illustrated in FIG. 10.

FIG. 11 is a plan view of a second side 204 of the bracket 20 illustrated in FIG. 10 that may include one or more of the features or elements of the bracket 20 of the previous figures. The bracket retainers 220, 220' extend cantilever over the opposing edges 200, 200' of the bracket 20. The bracket 20 includes openings 250 and bracket locks 210 extending in a uniform direction and cantilever from the bracket 20 into the openings 250.

Figure 12:
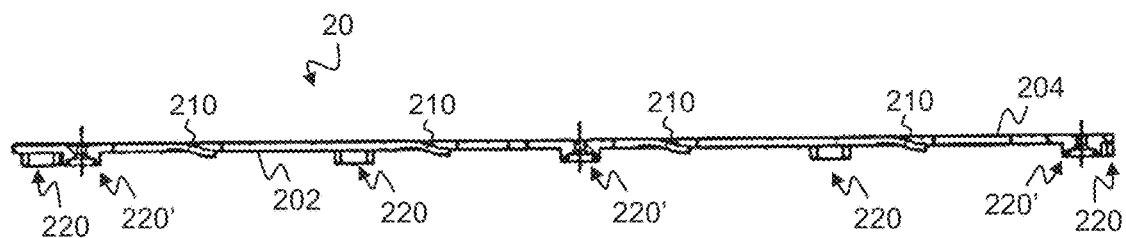
FIG. 12 is a view of the bracket along the line E-E shown in FIG. 10.

FIG. 12 is a view of the bracket 20 along the line E-E shown in FIG. 10. The bracket retainers 220, 220' project from the first surface 202. The bracket locks 210 extend beyond the first surface 202 of the bracket 20 and are configured to engage with an accessory lock 350 (see FIG. 9).

Figure 13:
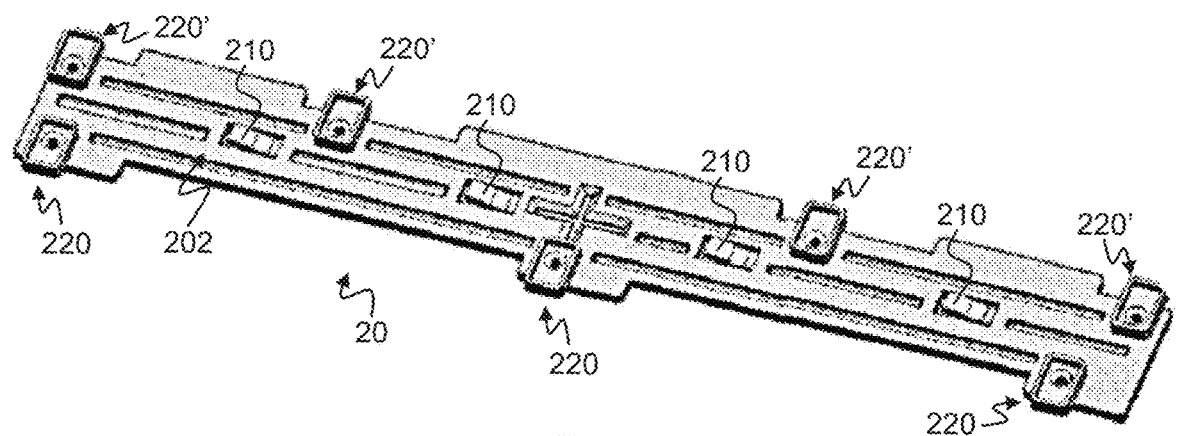
FIG. 13 is a perspective view of the bracket of FIG. 10.

FIG. 13 is a perspective view of the bracket 20. The bracket retainers 220, 220' project from the first surface 202. The bracket locks 210 extend in a uniform direction and cantilever from the bracket 20 beyond the first surface 202 of the bracket 20.

Figure 14:
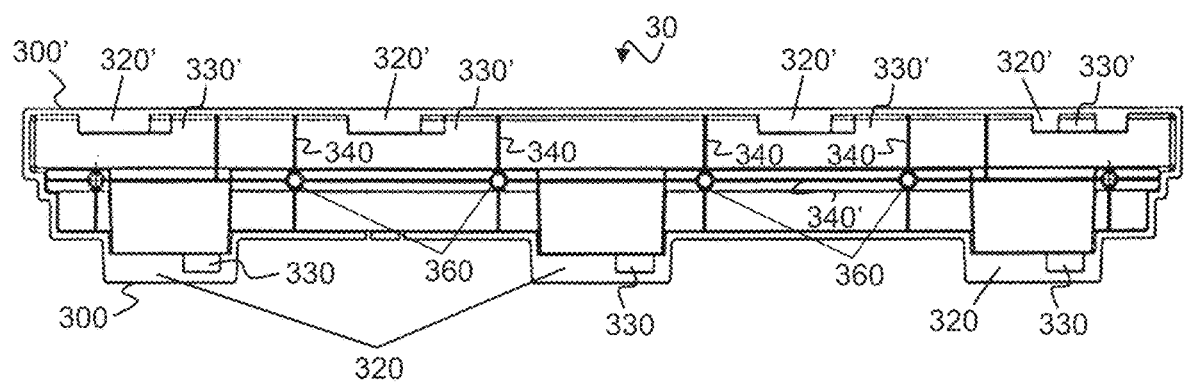
FIG. 14 is a plan view of an accessory.

FIG. 14 is a plan view of an accessory 30. The accessory 30 includes accessory retainers 320 extending cantilever from a first edge 300 of the accessory and accessory retainers 320' extending cantilever from a second edge 300' of the accessory 30. The first edge 300 and the second edge 300' are opposing edges. The accessory retainers 320 are arranged axially offset from the accessory retainers 320'. The accessory retainers 320, 320' define receiving features 330, 330' therebetween, which are gaps between and adjacent to the accessory retainers 320, 320'.

The accessory 30 includes ribs 340 extending transversely through the accessory 30 and a rib 340' extending longitudinally through the accessory 30. The accessory includes bosses 360 extending from an outwardly facing portion 310 and terminates at a cavity 312 (see FIG. 15). The ribs 340, 340' intersect with the bosses 360 and together provide structural reinforcement to the accessory 30 and define the cavity 312 (see FIG. 15).

Figure 15:
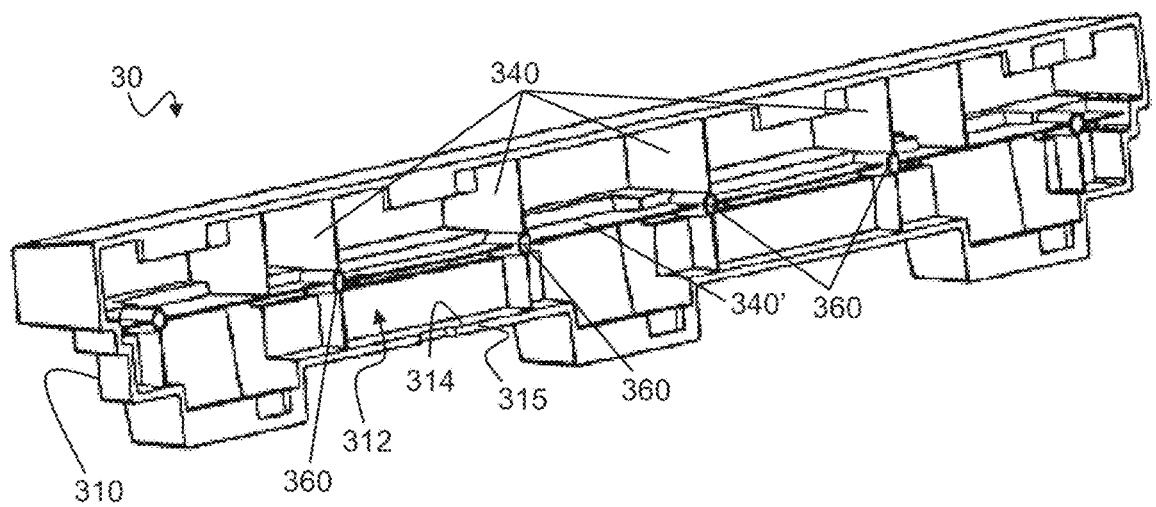
FIG. 15 is a perspective view of the accessory shown in FIG. 14.

FIG. 15 is a perspective view of the accessory 30 shown in FIG. 14. The ribs 340, 340' and the bosses 360 extend from the outwardly facing portion 310 and terminate at the cavity 312. The cavity 312 is defined by the ribs 340, 340', the bosses 360, and the sidewall 314; and the cavity 312 is dimensioned to accept a bracket 20 in an engaged position 50 and a locked position 60 (see FIG. 8 and FIG. 9) such that the bracket is positioned flush with the top edge 315 of the sidewall 314.

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value and the highest value enumerated are to be considered to be expressly stated in this application in a similar manner. Unless otherwise stated, all ranges include both endpoints and all numbers between the endpoints.

The terms "generally" or "substantially" to describe angular measurements may mean about +/−10° or less, about +/−5° or less, or even about +/−1° or less. The terms "generally" or "substantially" to describe angular measurements may mean about +/−0.01° or greater, about +/−0.1° or greater, or even about +/−0.5° or greater. The terms "generally" or "substantially" to describe linear measurements, percentages, or ratios may mean about +/−10% or less, about +/−5% or less, or even about +/−1% or less. The terms "generally" or "substantially" to describe linear measurements, percentages, or ratios may mean about +/−0.01% or greater, about +/−0.1% or greater, or even about +/−0.5% or greater.

The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

REFERENCE NUMERALS

10 Assembly
20 Bracket
30 Accessory
40 Fastener
50 Engaged position
60 Locked position
70 Architectural structure
80 First direction
90 Second direction
200 Edge
202 First side (Bracket)
204 Second side (Bracket)
206 First end (Bracket)
208 Second end (Bracket)
210 Bracket lock (Bracket)
212 Projection (Bracket)
220 Bracket retainer (Bracket)
222 First portion (Bracket)
224 Second portion (Bracket)
226 Beveled edge (Bracket)
230 Mounting hole (Bracket)
240 Alignment feature (Bracket)
250 Opening (Bracket)
260 Longitudinal axis (Bracket)
300 Edge (Accessory)
310 Outwardly facing portion (Accessory)
312 Cavity (Accessory)
314 Sidewall (Accessory)
320 Accessory retainer (Accessory)
330 Receiving feature (Accessory)
340 Rib (Accessory)
350 Accessory lock (Accessory)
360 Boss (Accessory)

The invention claimed is:

1. An assembly comprising:
a bracket comprising:
two or more bracket retainers, and
a bracket lock extending into an opening formed in the bracket; and
an accessory comprising:
two or more accessory retainers, and
an accessory lock;
wherein the two or more accessory retainers define receiving features, which are configured to accept the two or more bracket retainers when the accessory is in an engaged position with the bracket;
wherein the accessory has a sliding engagement with the bracket, from the engaged position to a locked position, in which the bracket lock engages with the accessory lock; and
wherein the accessory is a molding, a trim, a mantel, or a shelf.

2. The assembly of claim 1, wherein the two or more bracket retainers have a beveled edge and extend from a side of the bracket; and
wherein the beveled edge engages the two or more accessory retainers when the accessory is moved from the engaged position to the locked position.

3. The assembly of claim 2, wherein at least one of the two or more bracket retainers is located at a first edge of the bracket and at least one other of the two or more bracket retainers is located at a second edge of the bracket, opposing the first edge; and
wherein at least one of the receiving features is located at a first edge of the accessory and at least one other of the receiving features is located at a second edge of the accessory, opposing the first edge.

4. The assembly of claim 3, wherein the at least one of the two or more bracket retainers and the at least one other of the two or more bracket retainers are arranged axially offset from one another.

5. The assembly of claim 1, wherein the bracket lock comprises a projection that is engageable with the accessory lock in the locked position.

6. The assembly of claim 5, wherein moving the accessory from the engaged position toward the locked position causes the accessory to bias the bracket lock away from the accessory.

7. The assembly of claim 6, wherein in the locked position, the bracket lock is free from bias and returns to an unbiased position.

8. The assembly of claim 1, wherein the bracket includes a second bracket lock and a second opening formed in the bracket.

9. The assembly of claim 8, wherein the bracket lock and the second bracket lock are co-axially aligned with one another.

10. The assembly of claim 1, wherein the bracket comprises one or more mounting holes, which receive fasteners for attaching the bracket to a structure.

11. The assembly of claim 10, wherein the accessory is free of direct attachment to the structure.

12. The assembly of claim 1, wherein the bracket comprises one or more alignment features for aligning the bracket on a structure.

13. The assembly of claim 12, wherein the accessory comprises a cavity and in the engaged position, the bracket is positioned inside of the cavity.

14. The assembly of claim 13, wherein the accessory comprises one or more ribs, one or more bosses, or both.

15. The assembly of claim 1, wherein the accessory is positioned in the locked position by sliding the accessory lock in a direction of the bracket lock.

16. An assembly comprising:
a bracket comprising:
two or more bracket retainers, and
a bracket lock extending into an opening formed in the bracket; and
an accessory comprising:
two or more accessory retainers, and
an accessory lock;
wherein the two or more accessory retainers define receiving features, which are configured to accept the two or more bracket retainers when the accessory is in an engaged position with the bracket; and wherein the accessory has a sliding engagement with the bracket, from the engaged position to a locked position, in which the bracket lock engages with the accessory lock, wherein the bracket comprises one or more alignment features for aligning the bracket on a structure, and wherein the accessory comprises a cavity and in the engaged position, the bracket is positioned inside of the cavity.

17. An assembly comprising:
a bracket comprising:
  two or more bracket retainers, and
  two or more bracket locks each extending into respective two or more openings formed in the bracket; and
an accessory comprising:
  two or more accessory retainers, and
  an accessory lock;
wherein the two or more accessory retainers define receiving features, which are configured to accept the two or more bracket retainers when the accessory is in an engaged position with the bracket;

wherein the accessory has a sliding engagement with the bracket, from the engaged position to a locked position, in which the bracket lock engages with the accessory lock; and wherein the two or more bracket locks are co-axially aligned with one another.

18. The assembly according to claim 17, wherein the two or more bracket locks are co-axially aligned with one another, and the accessory is a molding, a trim, a mantel, a shelf.

19. The assembly of claim 18, wherein the bracket comprises one or more alignment features for aligning the bracket on a structure, and the accessory comprises a cavity and in the engaged position, the bracket is positioned inside of the cavity.

* * * * *